March 2, 1943.                C. A. OTTO                2,312,671
                        THERMOSTATIC AND LIKE UNIT
                          Filed Dec. 19, 1940

Inventor
Carl A. Otto
By
Dodge
Attorneys

Patented Mar. 2, 1943

2,312,671

UNITED STATES PATENT OFFICE 2,312,671

THERMOSTATIC AND LIKE UNIT

Carl A. Otto, Milwaukee, Wis., assignor to Johnson Service Company, Milwaukee, Wis., a corporation of Wisconsin Application December 19, 1940, Serial No. 370,889

6 Claims. (Cl. 297—12)

This invention relates to control devices such as thermostats and hygrostats, designed to combine stability with sensitivity and closeness of control. Such instruments are sometimes said to be "compensated," or to be of the "reset type."

Consider a simple leak port penumatic thermostat, for example, with throttled supply and leak port vent. Assuming air to be supplied at 15 pounds gauge, the thermostatic bar variably throttles the leak port and establishes temperature-controlling branch line pressures which vary from about 1 pound gauge when the leak port is wide open to 15 pounds gauge when the leak port is closed. For every such pressure there is a corresponding temperature. The range of temperature to produce this change of controlling pressure is called the modulating range. The drift of the instrument is the change of control point caused by change of load. Under excessive changes of load the drift will equal the modulating range.

If the modulating range is small in an uncompensated device, the control is unstable, just as an isochronous steam engine governor is unstable, but if the modulating range is large, stability is had at the price of a shifting control point, (i. e., excessive drift) very much as a sluggish but stable engine governor causes the engine to run slower as the load increases.

In the control of atmospheric conditions recourse has been had to devices which have a delayed response to changes of load and act to readjust a responsive element which is sensitive and exercises control in a limited range. These devices are complicated and subject to derangement. They are all expensive.

The present invention attacks the problem at its source by rendering the responsive element self-compensating. Thus simplicity is combined with certainty of action.

The underlying concept is a compound responsive element comprising two parts reacting in the same sense, one part characterized by rapid response but limited effective action and consequent wide drift, and the other by delayed response and much more marked effective action so that its drift is small. While the two parts so differentiated could merge gradually one into the other, it is considered preferable to use distinct units.

In operation, the slowly responding element readjusts or re-zeroes the rapidly responding element. The latter produces immediate stable regulation in response to minor or temporary fluctuation, while the former responds to sustained changes which result from changes of load. The delayed action prevents its inherent instability from interfering with the control.

Thus, assuming temperature control, if a fall of temperature causes the sensitive thermostat to call for heat, the same fall, if sustained (but not otherwise), causes the slowly acting thermostat to call for heat even more intensively. The effect is to relieve the sensitive thermostat from the demand as the result of accession of heat; so that in effect the sensitive thermostat is readjusted and its drift is neutralized at least approximately.

Thus stability and freedom from undue drift are combined in the responsive element itself.

Delayed action of the compensating thermostat may be had by thermally insulating it, or by associating it with substantial heat absorptive capacity, or both. These expedients have been used, for example, in thermostats controlling fire alarms and the like, but not in conjunction with compensation.

Compensation requires four things:

1. Delayed action of one unit relatively to the other.

2. Marked control effect (i. e., small drift) by the unit whose action is delayed. (In a pneumatic leak port thermostat such as above-described, say a change of fourteen pounds branch line pressure for one degree change of temperature).

3. Slight control effect (i. e., large drift) by the rapidly acting unit (in the same pneumatic thermostat say a change of only one pound branch line pressure for a one degree change of temperature).

4. Both units act in the same sense.

The inventive concept contemplates that the responsive units react directly on the leak port-and-valve couple to produce compensation by their own responses, so the correction is at the source and great simplification results, particularly in the construction of relays and other translating devices.

The compensating action can be explained for a leak port room thermostat having the response characteristics outlined above, as follows:

Suppose that there are 16 positions of the lid relatively to the leak port corresponding to 1 pound increments of branch line gauge pressure from 0 pounds gauge (leak port and heating valve wide open) to 15 pounds gauge (leak port and heating valve tight closed) and suppose the weather outdoors is mild and the lid is in 12 pound position.

Now suppose outdoor temperature drops sharply, increasing the heating load. If room temperature starts down and falls one degree, the sensitive wide drift thermostat opens the lid to 11 pound position. If the load is sustained, the delayed action narrow drift thermostat responds to the 1 degree drop 14 times as intensively. If it could act rapidly, it would move the lid past wide open position. However, before it gets much beyond the 11 pound position, temperature will be restored, and consequently the wide drift thermostat resumes control nearly at its original control point.

Thus the wide drift thermostat gives stability under short time fluctuations but the narrow drift slowly responding thermostat limits the drift for sustained changes practically to its own narrow range. Thus the control point is approximately stable.

Aside from the simplicity and directness of this solution of the problem, there is the additional advantage that other modifying devices may be associated with the compensated thermostatic unit, thus giving additional modifying effects without requiring undue mechanical complication.

Typical embodiments will now be described by reference to the accompanying drawing, in which.

Figure 1:
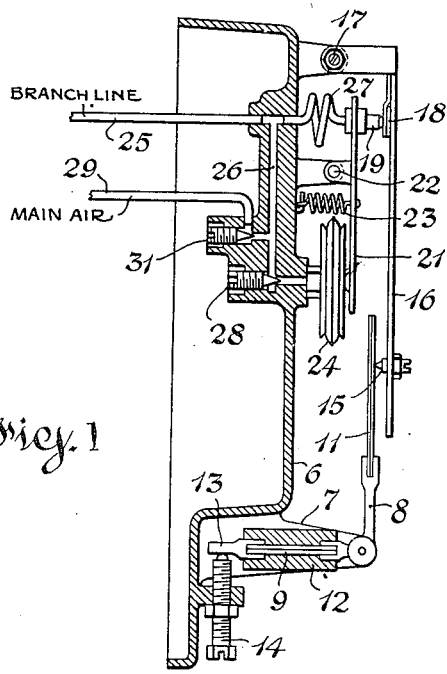
Fig. 1 is a view (chiefly in section) of a compensated leak port thermostat in which the compensation is effected by the use of two related bi-metallic bars. In this view there is illustrated as an optional addition a sensitivity fade-out which accelerates initial response without destroying stability.

*Embodiment of Fig. 1*

In Fig. 1 the base of the thermostat is indicated at 6. The cover is omitted and no relay is shown, the use of a relay being optional according to principles well understood in the art.

On the base 6 are brackets 7 between which is pivoted a carrier 8 which is L-shaped and carries one end of each of two bi-metallic thermostatic bars 9 and 11. The bar 9 is the slowly acting bar, being encased in thermal insulation 12 to delay its response to changes in temperature.

At its free end the bar 9 carries a head 13 which rests on the end of the adjusting screw 14, used to adjust the control point. The carrier 8 also carries the thermostatic bar 11, which, projecting upward, reacts outward against the adjustable thrust pin 15 on pendant lever 16. Lever 16 is pivoted at 17 and carries a valve pad 18 which coacts with the leak port 19. The pivot 17 is offset so that the lever 16 gravitates in a port-closing direction.

There are two possible arrangements which affect the characteristics of the thermostatic bars 9 and 11. These depend on whether the leak port 19 is fixed (as is the case of the leak port 71 in Fig. 2), or whether it is movably mounted as actually shown in Fig. 1. Both give compensation.

First, let us assume that the leak port 19 is fixed. In that case the metals of the bi-metallic bars are so chosen and the parts are so proportioned that the bar 9, when affected by a given change of temperature, will shift the valve 18 several times as far as the bar 11 will shift it in response to the same degree of temperature. Adjustment of the thrust pin 15 lengthwise of the lever 16 affects the relationship by varying the effective length of the bar 11, and this adjustment also changes the total effect of both thermostatic bars on the valve 18 by changing the overall leverage ratio. The important thing is that both bars cause valve 18 to move in the same direction in response to a given temperature change.

The arrangement with the leak port 19 fixed will give compensation so that the instrument would be stable and substantially devoid of drift. However, the precision required in the mechanical construction is extreme because of the range of motion of the valve 18 to effect control is necessarily rather minute. Consequently it is preferred to use a movable mounting for the leak port 19, as shown in Fig. 1.

The proportional relationship of the response of the bar 9 to the bar 11 need not be changed but their total or overall effect may be greater because there is a compensatory adjustment of the position of the leak port 19 for every adjustment of the valve 18. This permits a little coarser action without entailing any loss of precision of control.

The movable mounting of the leak port 19 can also be used to produce a sensitivity fadeout for any desired degree, that is to say, it affords a sharp initial response which diminishes at a rate controllable by adjustment of a valve.

In Fig. 1 the leak port 19 is shown mounted on a lever 21 which is fulcrumed at 22 and urged to swing clockwise by a tension spring 23 against the opposing force exerted by an expansible cell or bellows 24.

The branch line 25 is connected to passage 26 which is in free communication with leak port 19 through the slender flexible tube 27 coiled in a spiral to increase its flexibility. The branch passage 26 is in restricted communication with the interior of the cell 24 past the needle valve 28, so that changes of pressure in the branch line become effective in the bellows only after a time lag controlled by the adjustment of valve 28.

The supply line 29, fed from any suitable source with air under pressure (15 pounds gauge or more) supplies the passage 26 through the restricting needle valve 31, which is so set that port 19 will vent the branch line 25 nearly to atmospheric pressure when the leak port is open wide.

In this structure, as in the case of the fixed leak port above discussed, the bar 11 responds rapidly to temperature changes but tends to produce only a relatively small change of pressure per degree change of temperature as compared with the change of pressure produced by the bar 9 per degree change of temperature. The ratio of the two might be 14 to 1, as in the case above discussed, but the actual movement produced on the valve 18 could be made greater in a mechanical sense because, whenever the valve 18 moves to close the movable leak port 19, the port 19, as a result of that action and after a delay determined by the adjustment of the valve 28, will retreat and thus develop a neutralizing opening tendency.

Assuming now that the parts (either with or without a movable leak port) are so coordinated that the bar 11 will change pressure in port 26 one pound per Fahrenheit degree, it follows that if bar 11 alone controlled and extreme fluctuations of load occurred, the modulating range of the instrument would be about 14° F. If the bar 9, through its response to temperature, changes the pressure in port 26 fourteen pounds per Fahrenheit degree, the drift under extreme load changes would only be one degree assuming bar 9 alone in control. In the absence of thermal insulation, control by the bar 9 would be unstable. The insulation delays the response so that in effect bar 9 responds only to changes of load which evidence themselves in sustained changes of indoor temperatures. Thus the bar 9 is constantly re-zeroing the bar 11 in response to load changes, while the bar 11 responds to minor local fluctuations. Thus the desirable characteristics of both bars are combined and a sensitive control characterized by narrow drift is had.

Obviously bar 11 can be chosen so as to compensate more or less effectively, but slight under compensation is the result normally attained because any imposed time lag causes a hysteresis which is affected by the rate of change of temperature. It follows that the correct degree of insulation is a vital factor in attainment of the result. It is determinable by trial and error, if not otherwise.

The effect of the movably mounted leak port 19, shiftable by the bellows 24 which have a delayed response to changes in branch line pressure, is to produce what is sometimes called neutralization. Neutralization is antithetical to true compensation but has sometimes been used to prevent hunting. As here used its purpose is to give a sharp initial response followed by a fade-out. This action is desirable with certain types of apparatus which require a sharp controlling impulse to start them into action.

When the valve 18 starts to increase the throttling of the leak port 19, the initial rise of pressure in the branch pipe 25 does not affect the leak port, but after a brief delay it causes the leak port to retreat, thus partially neutralizing the initial closing. Conversely, opening movement will cause the leak port to advance and reduce the opening after a brief time interval.

If the time lag is not desired, the valve 28 is opened wide, so that the movable leak port and bellows 24 merely effect partial neutralization. Its effect, as above explained, is to reduce the need for extreme precision in the manufacture of the thermostatic units and the mechanical connections operated thereby.

The compensated thermostatic unit offers a convenient opportunity to add this neutralizing or fadeout apparatus. The two together produce a control which is highly desirable for certain purposes. The fact, however, must be borne in mind that the invention gives compensation without requiring the movable leak port 19.

Figure 2:
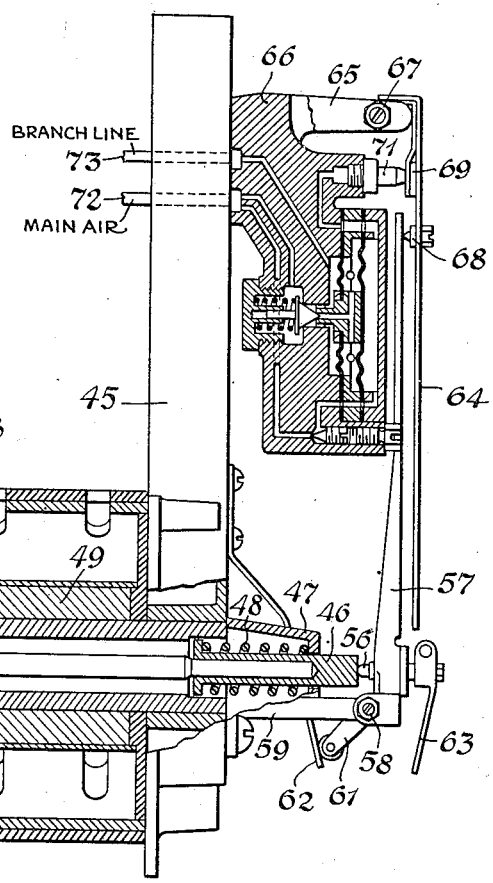
Fig. 2 is a view in section of an insertion thermostat with relay, the thermostatic unit embodying the invention. Adjustable means for varying the time lag of the thermostatic couple whose action is delayed are shown.
Figure 3:
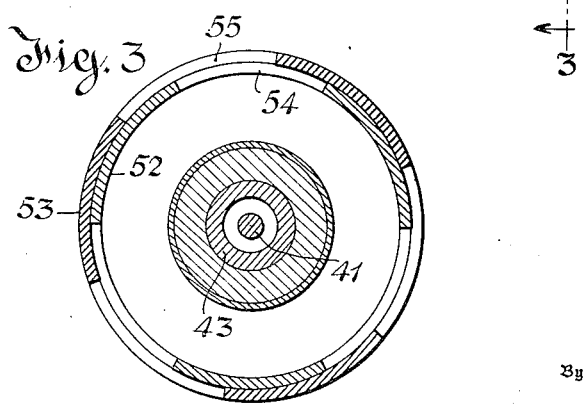
Fig. 3 is a section on the line 3—3 of Fig. 2.

Embodiment of Figs. 2 and 3

Figs. 2 and 3 show how the invention may be embodied in an insertion thermostat. The thermostatic couple in these figures is intended to be inserted through an opening in the wall of a duct, and comprises a relatively inexpansible rod 41 composed of the alloy sold under the trade name "Invar," and a relatively expansible element such as a tube of metal (say, brass) having a relatively high coefficient of expansion. According to the invention this takes the form of a unitary tube having a thin rear portion 42 and a relatively thick front portion 43. A cap 44 brazed to the end portion 42 offers thrust engagement to the rod 41. The forward end of the portion 43 is fixed in the base plate 45 and the forward end of the rod 41 is socketed in a combined guide and spring seat element 46. The member 46 is confined by a guiding element 47 mounted on the base 45. A coil compression spring 48 reacts between the flange on the member 46 and a portion of the member 47 to hold the rod 41 rearward against the cap 44.

The purpose of using a thick tubular portion 43 and a thin tubular portion 42 is to make the portion 42, which is directly exposed to air in a duct or the like, relatively rapid in its response to changes of temperature, whereas the portion 43, because of its greater mass and consequently greater heat absorptive capacity, would have a slower response. The coefficient of expansion of the portions 42 and 43 could and commonly would be the same, but since the portion 43 has a length which is twice or more the length of the portion 42, it is obvious that the adjustment effected by the portion 43 is two or more times the adjustment effected by the portion 42, just as the bar 9 in Fig. 1 has a more intense effect than the bar 11.

Further to delay the response of the portion 43 it may be sheathed in thermal insulation 49 of any suitable type confined by a sleeve 51. In addition access of air flowing in contact with the instrument may be controlled by using two concentric shells 52 and 53 having slots 54 and 55 which may be brought more or less into register by rotating one shell relatively to the other. The details of construction are not important. The important thing is that the response of the portion 43 can be delayed more or less. The insulation 49 could be omitted. Also the thickness of the tube 43 may be varied to modify its heat storage capacity. Thus three distinct means are shown to delay the thermal response of the portion 43 of the thermostat. Local conditions will determine which will be used. The important thing is to fix the time lag of the element 43 to correspond with the characteristics of the controlled heat supply.

The thrust member 46 reacts at its forward end on the thrust screw 56 which is threaded into a lever 57. This lever is pivoted at 58 on a bracket 59 carried by the base 45. The arm 61, forming part of the lever 57, carries at its end a roller which reacts against a leaf spring 62 fixed on the base 45. The spring serves to urge the lever 57 counterclockwise as viewed in Fig. 2. Pointer 63 is provided to indicate the adjustment of the screw 56. It is intended to coact with a dial, not shown in the drawing.

The lever 57 is parallel with a lever 64 when the leak valve is closed, and this lever is pivoted at 67 to a bracket 65 integral with the base 66 of a relay hereafter mentioned. Under the influence of gravity lever 64 tends to swing clockwise, that is inward toward the base 45. The thrust lug 68 is adjustable longitudinally on the lever 64 and serves to modify the motion ratio between the lever 57 and a valve 69 carried by lever 64. The valve 69 controls the leak port 71 which controls the relay.

The relay is a class 1 relay, and will be recognized as conforming to the disclosure of the patent to Otto, No. 1,500,260, issued July 8, 1924. The relay is supplied with air under pressure through a supply line 72 and functions to establish in a branch line 73 a pressure which rises from approximately atmospheric (when the leak port 71 is wide open) to equality with the main air supply when the leak port is tight closed.

Since compensatory effect is wholly local to the thermostatic unit, and since the use of the relay is optional, it is unnecessary to describe the construction of the relay in detail. It is fully set forth in the patent mentioned.

The important fact to be gained from Figs. 2 and 3 is that in a relay thermostat it is possible to secure compensation in the thermostatic unit itself without requiring any modification in the construction of the relay.

Further, Fig. 2 shows a compensated thermostat with a fixed leak port 71. It must, however, be remembered that the compensating effect is secured by controlling the approach and recession of the valve, such as 69, and the leak port, such as 71, by two thermostatic elements 42 and 43 which conjointly control approach and recession. Any mechanical arrangement which would allow these two thermostatic components to control approach and recession of the valve and leak port according to the principles of the invention is within the inventive concept. It is simpler to associate both the differentiated thermostatic elements with the valve element.

Compensation is significant in any controlling device whose action is progressive. Both embodiments of the compensated thermostatic element show its use with a pneumatic thermostat because as a rule a pneumatic leak port thermostat offers the simplest arrangement for securing graduated control. It is not, however, the only known means for securing such control and the invention can be applied to thermostatic units generally where these are used to control the motion of a progressive control, whether that control be exercised by the movement of one component or by the relative positioning of two components, such as the valve and leak port characteristic of the illustrated embodiments.

Thus the two embodiments described in detail are intended to be illustrative and not limiting, the scope of the invention being defined solely in the claims.

What is claimed is:

1. An inherently compensated thermostat comprising two thermostatic units affected by the same temperature changes; means for differentiating said units as to rapidity of response to such changes; means for cumulatively combining the response of said thermostats; and means associated with the last named means for limiting the effect of the rapidly responding unit to a small proportion of the cumulative effect.

2. An inherently compensated thermostatic device comprising in combination, at least two thermally deformable elements, one of said deformable elements being directly exposed to temperature changes and being characterized by small deformation per degree temperature change, and the other of said elements being characterized by greater deformation per degree temperature change; means for shielding the second of said elements to impose a time lag in its response; and means for deriving motion cumulatively from concurrent deformation of said elements.

3. An inherently compensated controlling unit comprising in combination, two cumulatively acting responsive units, each of which responds directly to a single variable atmospheric condition whose variations are to be sensed, and each of which deforms independently of the other in such response, the first unit being fully exposed to the variable condition and so formed as to have relatively small deformation in response to a given variation of the condition, with minimum practicable time lag, and the second unit being so formed as to have larger deformation in response to the same variation of the condition; and means for delaying the response of the second unit to the variation of the variable condition.

4. An inherently compensated thermostatic device comprising in combination, at least two thermally deformable elements, one of said deformable elements being directly exposed to temperature changes and being characterized by small deformation per degree temperature change, and the other of said elements being characterized by greater deformation per degree temperature change; means for shielding the second of said elements to impose a time lag in its response; means for adjusting said shield to vary such time lag; and means for deriving motion cumulatively from concurrent deformation of said elements.

5. An inherently compensated thermostatic device comprising in combination at least two thermally deformable elements, one of said elements being characterized by small heat absorptive capacity and small deformation per degree temperature change, and the other element being characterized by substantial heat absorptive capacity and a relatively large deformation per degree temperature change; and means for deriving motion cumulatively from concurrent deformation of said elements.

6. An inherently compensated thermostatic device comprising in combination at least two thermally deformable elements, one of said elements being characterized by small heat absorptive capacity and small deformation per degree temperature change, and the other element being characterized by substantial heat absorptive capacity and a relatively large deformation per degree temperature change; adjustable shielding means for variably delaying the response of the second named element to temperature changes; and means for deriving motion cumulatively from concurrent deformation of said elements.

CARL A. OTTO.